No. 614,496.  
E. B. PHILLIPS.  
BICYCLE TREAD.  
(Application filed Nov. 9, 1897.)  
Patented Nov. 22, 1898.
(No Model.)
- FIG. I -
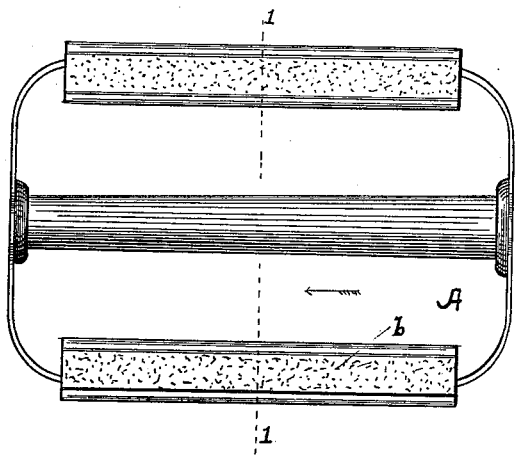
- FIG. II -
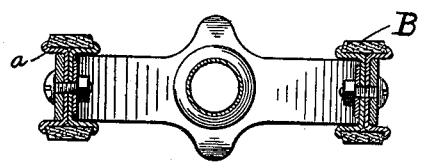
WITNESSES:  
J. C. Turner  
D. T. Davies.
INVENTOR  
E. B. Phillips  
BY  
J. D. Fay  
ATTORNEY.

UNITED STATES PATENT OFFICE.

ELBERT B. PHILLIPS, OF CLEVELAND, OHIO.

BICYCLE-TREAD.

SPECIFICATION forming part of Letters Patent No. 614,496, dated November 22, 1898.

Application filed November 9, 1897. Serial No. 657,952. (No model.)

*To all whom it may concern:*

Be it known that I, ELBERT B. PHILLIPS, a citizen of the United States, and a resident of Cleveland, county of Cuyahoga, and State of Ohio, have invented a new and useful Improvement in Bicycle-Treads, of which the following is a specification, the principle of the invention being herein explained and the best mode in which I have contemplated applying that principle, so as to distinguish it from other inventions.

My invention relates to improved treads for bicycle-pedals.

The annexed drawings and the following description set forth in detail certain mechanism embodying the invention, such disclosed means constituting but one of various mechanical forms in which the principle of the invention may be used.

In said annexed drawings, Figure I is a plan view of a bicycle-pedal provided with my improved treads. Fig. II is a central vertical sectional view on line I I of Fig. I.

Heretofore bicycle-pedal treads have usually been made of metal with saw-teeth edges or the so-called "rat-trap" pedal or have been covered with rubber roughened or corrugated. Both these treads have their objections. The rat-trap pedals cut into and destroy the soles of the rider's shoes and are uncomfortable to the feet. The rubber treads wear smooth and they no longer retain any grip on the shoe-soles, and the riders are liable to lose their pedals when riding rapidly or over rough surfaces. My invention obviates both these difficulties.

It consists in making a tread of lead or other similar soft metal, such as aluminium, and of rolling therein or otherwise securing to the surface of the tread a gritty substance—such as emery, carborundum, &c.—that will give a good grip to the tread and prevent its wearing smooth and slippery under use. I preferably unite the two substances together by rolling the grit into the lead, but may mold it into the lead or otherwise secure it therein.

A pedal A, of any well-known variety, is provided with the pedal-tread grip a, in which is secured in the usual manner the tread B, said tread having secured therein the gritty substance b.

Other modes of applying the principle of my invention may be employed instead of the one explained, change being made as regards the mechanism herein disclosed, provided the means covered by the following claim be employed.

I therefore particularly point out and distinctly claim as my invention—

A bicycle-pedal tread composed of lead or other soft metal, and grit, substantially as set forth.

Signed by me this 2d day of November, 1897.

ELBERT B. PHILLIPS.

Attest:
   D. T. DAVIES,
   J. B. FAY.